(12) United States Patent
Zorek et al.

(10) Patent No.: US 8,631,251 B2
(45) Date of Patent: Jan. 14, 2014

(54) SYSTEM MANAGEMENT CONTROLLER ENTRY INTO REDUCED POWER STATE RESPONSIVE TO OTHER HARDWARE ENTERING REDUCED POWER STATE

(75) Inventors: Edward V. Zorek, Cary, NC (US);
David P. Harrigan, Durham, NC (US);
Kevin S. Stansell, Raleigh, NC (US);
Jeremy M. Savoy, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 12/647,354

(22) Filed: Dec. 24, 2009

(65) Prior Publication Data

US 2011/0161698 A1  Jun. 30, 2011

(51) Int. Cl.
*G06F 1/00* (2006.01)
(52) U.S. Cl.
USPC .......................................................... 713/300
(58) Field of Classification Search
USPC .................................................. 713/300, 320
See application file for complete search history.

(56) References Cited

U.S. PATENT DOCUMENTS

| 6,209,088 | B1 | 3/2001 | Reneris |
| 6,651,181 | B1* | 11/2003 | Lacey ............................ 713/503 |
| 7,017,034 | B2* | 3/2006 | Qureshi et al. ..................... 713/1 |
| 7,058,831 | B2 | 6/2006 | Cheok et al. |
| 7,062,668 | B2 | 6/2006 | Kwahk et al. |
| 7,260,728 | B2* | 8/2007 | Chang et al. .................. 713/300 |
| 2004/0127265 | A1 | 7/2004 | Van Bosch et al. |
| 2007/0094525 | A1* | 4/2007 | Uguen et al. .................. 713/300 |

* cited by examiner

*Primary Examiner* — Mohammed Rehman
(74) *Attorney, Agent, or Firm* — Thomas Tyson

(57) ABSTRACT

A system includes an operating system, first hardware, second hardware, and a system management controller, the latter which also may be considered an integrated management module or a baseboard management module. The first hardware executes the operating system and is under control of the operating system. The operating system causes the first hardware to enter a first reduced power state. The second hardware is different than the first hardware and is not under control of the operating system. The system management controller is implemented by the second hardware. In response to the operating system causing the first hardware to enter the first reduced power state, the system management controller causes the second hardware to enter a second reduced power state corresponding to the first reduced power state. The first reduced power state may be a more-power-conserving reduced power state than the second reduced power state.

16 Claims, 4 Drawing Sheets

SYSTEM MANAGEMENT CONTROLLER ENTRY INTO REDUCED POWER STATE RESPONSIVE TO OTHER HARDWARE ENTERING REDUCED POWER STATE

FIELD OF THE INVENTION

The present invention relates generally to first hardware of a system entering a reduced power state to reduce power used by the hardware. The present invention relates more particularly to second hardware of a system including a system management controller also entering a reduced power state in response to the first hardware entering its reduced power state.

BACKGROUND OF THE INVENTION

In enterprises and other organizations that employ large numbers of computing systems, the computing systems may be remotely managed to improve productivity. Each computing system—i.e., each computing device—may include a system management controller, which can also be referred to as a baseboard management controller or an integrated management module. The system management controllers typically communicate with a management console, which may be a separate computing system or device that is used by a network administrator.

The network administrator may thus receive status information regarding the computing systems from the system management controllers via the management console, and in turn control the systems by issuing commands at the management console which are then communicated to the system management controllers. Types of information that can be received from the system management controllers include temperature, cooling fan speed, power mode, operating system status, and so on. Types of commands that can be issued at the management console for communication to the system management controllers include system power cycling, and system reset.

To conserve power, the management console may automatically, or as manually instructed by the network administrator, issue a command to a system management controller for its corresponding computing system to enter a reduced power state. In turn, the system management controller causes the computing system to enter the reduced power state in question. For instance, the system management controller may communicate the command to the operating system running on the computing system, which then causes the computing system to enter the reduced power state. Alternatively, the command may be issued at the management console, and sent directly to the operating system, without passing through the system management controller.

SUMMARY OF THE INVENTION

A system of an embodiment of the invention includes an operating system, first hardware, second hardware, and a system management controller. The first hardware is to execute the operating system and is under control of the operating system. The operating system is to cause the first hardware to enter a first reduced power state to reduce power used by the first hardware. The second hardware is different than the first hardware and is not under control of the operating system. The system management controller is implemented by the second hardware. In response to the operating system causing the first hardware to enter the first reduced power state, the system management controller is to cause the second hardware to enter a second reduced power state corresponding to the first reduced power state to also reduce power used by the second hardware.

A method of an embodiment of the invention includes an operating system causing first hardware under its control to enter a first reduced power state to reduce power used by the first hardware. After the first hardware enters the first reduced power state, and in response to the first hardware entering the first reduced power state, a system management controller causes second hardware to enter a second reduced power state corresponding to the first reduced power state to also reduce power used by the second hardware. The first hardware executes the operating system, and the second hardware is different than the first hardware and is not under control of the operating system. The first hardware, the second hardware, the operating system, and the system management controller are part of a system.

A system management controller of an embodiment of the invention is for a system that includes the system management controller, an operating system, and first hardware under control of the operating system. The system management controller includes second hardware and a component of the second hardware. The second hardware is different than the first hardware and is not under control of the operating system. The component is, in response to the operating system causing the first hardware to enter a first reduced power state to reduce power used by the first hardware, to cause the second hardware to enter a second reduced power state corresponding to the first reduced power state to also reduce power used by the second hardware.

A computer-readable storage medium of an embodiment of the invention has computer-readable code stored thereon for execution by a system management controller of a system that includes the system management controller, an operating system, first hardware, and second hardware. The first hardware is under control of the operating system, and the second hardware is to implement the system management controller and is not under control of the operating system. The computer-readable code is, in response to the operating system causing the first hardware to enter a first reduced power state to reduce power used by the first hardware, to cause the second hardware to enter a second reduced power state corresponding to the first reduced power state to also reduce power used by the second hardware.

DETAILED DESCRIPTION OF THE DRAWINGS

Figure 1:
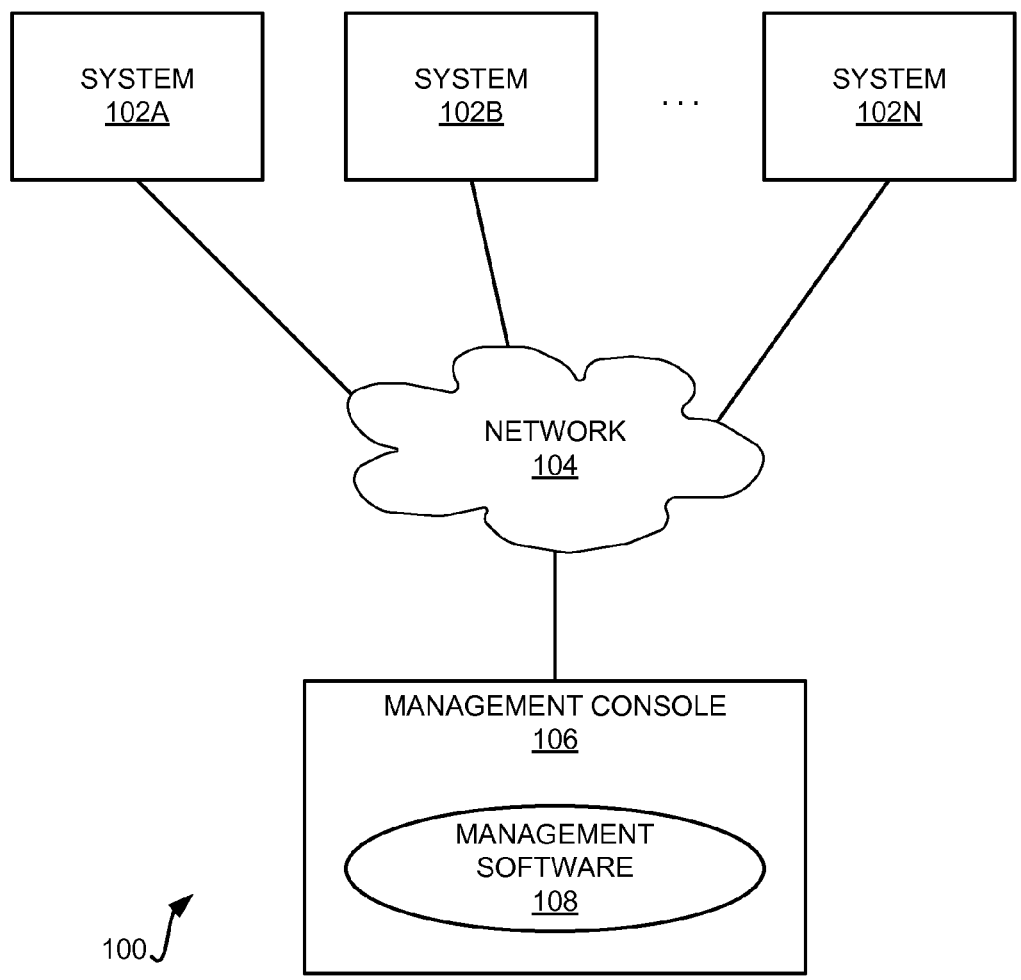
FIG. 1 is a diagram of a representative computing system architecture, according to an embodiment of the present invention.

As noted in the background section, an operating system running on a computing system may receive a command from a management console, through the system management controller of the computing system, to cause the computing system to enter a reduced power state. In response, the operating system causes the computing system to enter the reduced power state. However, not all hardware of the computing system actually enters the reduced power state, and may indeed be consuming an inordinate amount of electrical power.

For example, a computing system can include an operating system, hardware on which the operating system is executed and that is under control of the operating system, and a system management controller. The system management controller is implemented by hardware other than the hardware that is under control of the operating system. Therefore, when the operating system is said to cause the system to enter a reduced power state, in actuality what occurs is that the hardware on which the operating system is executed, and this is under the control of the operating system, enters the reduced power state.

The other hardware, which implements the system management controller, does not enter the reduced power state. The system management controller, and the hardware on which it is implemented, are not under the control of the operating system. This separation is by design, so that failures occurring in the operating system and in the hardware on which the operating system is executed do not affect the running of the system management controller. Rather, the system management controller is a separate piece of hardware. If the operating system crashes, the system management controller nevertheless remains running.

A system management controller may be implemented using relatively power-hungry hardware. As such, even if the hardware on which the operating system is running and that is under the control of the operating system is placed in a reduced power state, the computing system as a whole may still consume undesirably large amounts of power. This is because the system management controller is still running no differently than if the operating system had not placed the hardware under its control in a reduced power state.

Embodiments of the present invention permit the system management controller itself to enter a reduced power state, in correspondence with the hardware on which the operating system is running entering a reduced power state. When the operating system causes the hardware under its control to enter a reduced power state, it may send a message to the system management controller that this has occurred. In response, the system management controller then causes the hardware on which it is implemented to also enter a corresponding reduced power state. As such, less power is consumed by the computing system as a whole.

It is noted that the reduced power state that the system management controller enters may not be the same as the reduced power state that the operating system causes the hardware under its control to enter. For example, the operating system may cause the hardware on which it is running to enter a hibernation, or save-to-disk, reduced power state, in which the hardware is completely off, but in which memory contents have been saved as a temporary file on a hard disk drive. The system management controller, however, may not enter this same reduced power state, so that it is still able to respond to communications from the management console.

FIG. 1 shows a representative computing system architecture 100, according to an embodiment of the invention. The architecture 100 includes a number of computing systems 102A, 102B, . . . , 102N, which are collectively referred to as the computing systems 102, and which can each be a separate computing device, like a separate server. The architecture 100 further includes a network 104 and a management console 106.

The management console 106 and the computing systems 102 are communicatively interconnected with one another by the network 104. The network 104 may be any type of network, and may include one or more of a local-area network (LAN), a wide-area network (WAN), an intranet, an extranet, the Internet, and so on. The network 104 furthermore may simply be an interconnect that communicatively connects the management console 106 with the computing systems 102.

The management console 106 is a computing device that is separate from the computing systems 102. The management console 106 permits a network administrator or other type of user to manage the computing systems 102. In this respect, the management console 106 has management software 108 running thereon. The management software 108 may receive the types of information from the computing systems 102 that have been described above, and permit the issuance of the types of commands for execution on the systems 102 that have also been described above.

Figure 2:
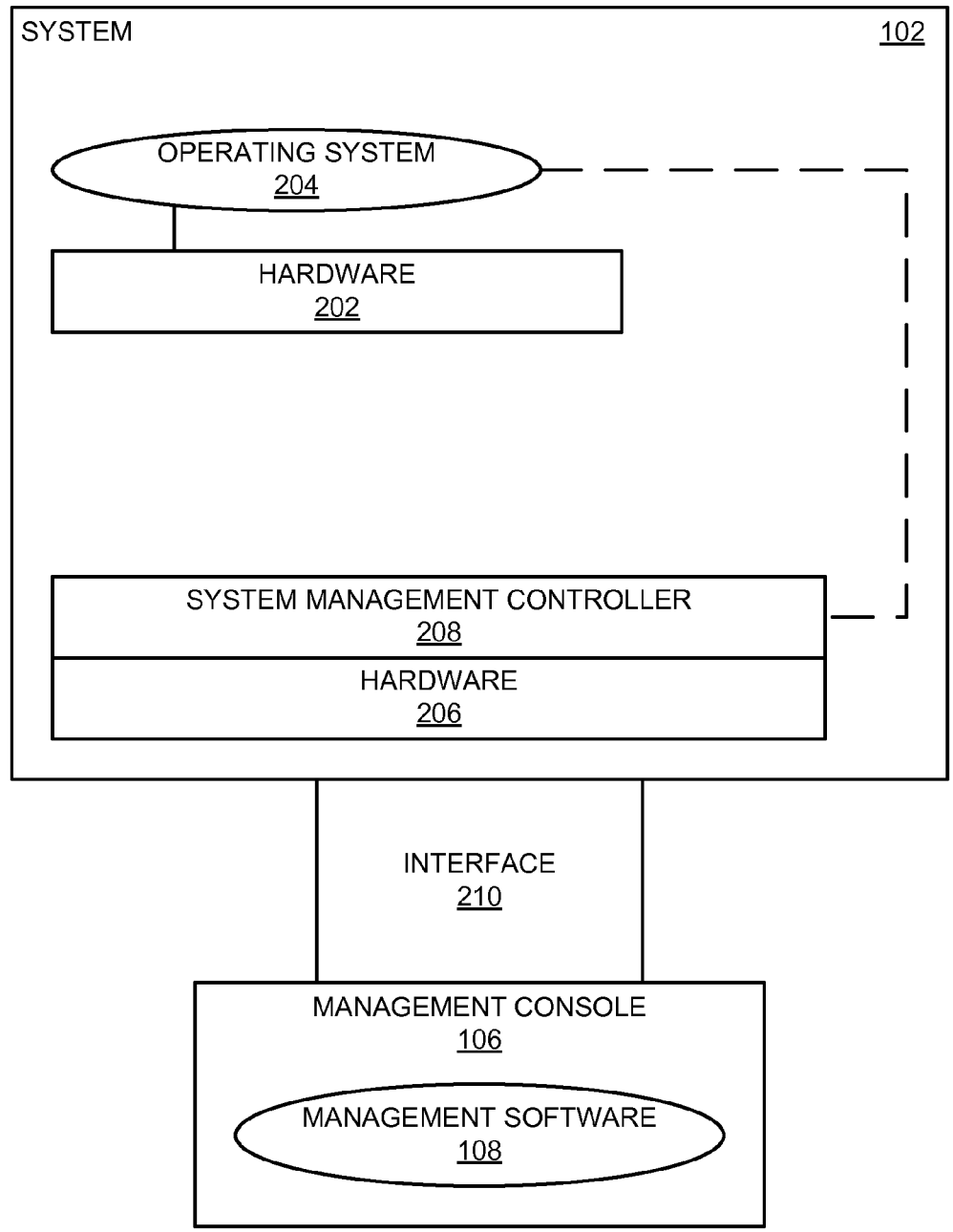
FIG. 2 is a diagram of a representing computing system of the architecture of FIG. 1, according to an embodiment of the present invention.

FIG. 2 shows a representative computing system 102, according to an embodiment of the invention. The computing system 102 includes hardware 202, an operating system 204, different hardware 206, and a system management controller 208. The computing system 102 may be a single computing device, such as a server computing device, separate from other computing devices.

The operating system 204 is executed (i.e., run) on the hardware 202, which is under the control of the operating system 204. The hardware 202 can include processors, memory, hard disk drives, network adapters, and other types of hardware. Examples of operating systems include the LINUX® operating system, include the LINUX® operating system, where LINUX® is a trademark of Linus Torvalds, and the Microsoft® Windows® operating system, where Microsoft® and Windows® are trademarks of Microsoft Corp., of Redmond, Wash.

The hardware 206 is different than the hardware 202, and is not under the control of the operating system 204. Rather, the hardware 206 implements the system management controller 208. In one embodiment, the hardware 206 can be considered to be part of the system management controller 208. The hardware 206 can also include processors, memory, hard disk drives, network adapters, and other types of hardware. The hardware 202 on which the operating system 204 runs may be considered a user part of the computing system 102 that is used to execute application programs and perform other types of functionalities for end users. By comparison, the hardware 206 that implements the system management controller 208 may be considered a privileged management part of the computing system 102 that is used exclusively to permit remote management of the system 102 as a whole, including the hardware 202 and the operating system 204, by just network administrators.

The system management controller 208 may also be considered or referred to as an integrated management module and/or a baseboard management module. The system management controller 208 is considered to manage a logical interface 210 between the management software 108 and the computing system 102, the latter including the operating system 204 and the hardware 202. The management software 108, as noted above, runs on the management console 106, and is external to and separate from the computing system 102. That is, the management software 108 does not run on any part of the computing system 102. It is through the logical interface 210 through which the system management controller 208 reports information regarding the computing system 102 to the management console 106, and to which the controller 208 receives commands to pass to the operating system 204 from the console 106. Alternatively, commands may be received by the operating system 204 directly from the console 106, without passing through the system management controller 208.

In general operation, the operating system 204 is said to cause the computing system 102 to enter a reduced power state. As noted above, the entire computing system 102 in actuality does not enter the reduced power state. Rather, just the hardware 202 under the control of the operating system 204 does. In this respect, the power used by the hardware 202 is reduced.

The power states that the operating system 204 can specifically cause the hardware 202 to enter may be those that are provided by the Advanced Configuration and Power Interface (ACPI) specification, which is an open standard developed within the industry. Power states under this standard include the working G0/S0 state, the sleeping S1 state, the soft off G2/S5 state, and the mechanical/hard off G3 state. The sleeping S1 state can be divided into S1, S2, S3, and S4 states. In the S1 state, processors are stopped but still receive power, and memory still receives power. In the S2 state, processors do not receive power, but memory still receives power. In the S3 state, which is also referred to as the standby, processors do not receive power, and memory still receives power, but are refreshed more slowly (i.e., consume less power) than in S2 state. In the S4 state, which is also referred to as the hibernation state, no hardware receives power, but the contents of memory are temporarily saved as a file on a hard disk drive.

In one embodiment, the operating system 204 may receive an instruction from the management software 108 to cause the computing system 102 to enter a reduced power state. This instruction may be received through the interface 210 managed by the system management controller 208. In response to receiving this message, the operating system 204 causes the computing system 102 to enter the reduced power state in question. As noted above, however, because the hardware 206 is not under the control of the operating system 204, the operating system 204 just causes the hardware 202 to enter the reduced power state. The operating system 204 does not control the system management controller 208, and therefore cannot cause the hardware 206 to enter the reduced power state.

However, in response to the operating system 204 causing the hardware 202 to enter the reduced power state, the system management controller 208 itself causes the hardware 206 to enter a corresponding reduced power state, to reduce the power used by the hardware 206. For instance, after the hardware 202 has been placed in a reduced power state, the operating system 204 may send a message to the system manage controller 208, indicating that the operating system 204 has caused the hardware 202 to enter a reduced power state. In response to receiving this message, the system management controller 208 causes its hardware 206 to also enter a corresponding reduced power state.

The reduced power state that the hardware 206 enters per the direction of the system management controller 208 corresponds to the reduced power state that the hardware 202 enters per the direction of the operating system 204. In one embodiment, the reduced power state that the hardware 206 enters is identical to the reduced power state that the hardware 202 enters. However, in another embodiment, the reduced power state that the hardware 206 enters is similar, but not identical to, the reduced power state that the hardware 202 enters. In particular, the reduced power state that the hardware 206 enters may be a less-power-conserving reduced power state than the reduced power state that the hardware 202 enters.

For example, the reduced power state that the hardware 202 enters may be the G2/S5 off state, as governed by the ACPI specification. In this reduced power state, all the hardware 202 is completely off, and the operating system 204 has completely shut down, such that nothing has been saved. For the operating system 204 to again run, the operating system 204 has to be rebooted from this state. By comparison, the reduced power state that the hardware 206 enters as corresponding to the G2/S5 off state that the hardware 202 enters may be comparable to the S3 standby state, which is a less-power-conserving reduced power state than the G2/S5 off state.

The reason why the hardware 206 enters a reduced power state that corresponds to, but that may not be identical to, the reduced power state that the hardware 202 enters is that the system management controller 208 may still have to periodically perform tasks even if the operating system 204 does not. For example, the computing system 102 may be a secondary web server that is periodically used just when a primary web server is overburdened. When the primary web server is not overburdened, the hardware 202 is placed in the G2/S5 off state.

While the hardware 202 is in the G2/S5 off state, the system management controller 208 may just have to listen for a command from the management software 108 to take the hardware 202 out of this state. Therefore, the system management controller 208 may not have to perform its usual functionality of periodically reporting temperature, fan speeds, and so on, of the hardware 202 to the management software 108. As such, much of the hardware 206 can be placed in a reduced-power state, but some of the hardware 206 has to remain on so that it is able to receive commands from the management software 108.

Figure 3:
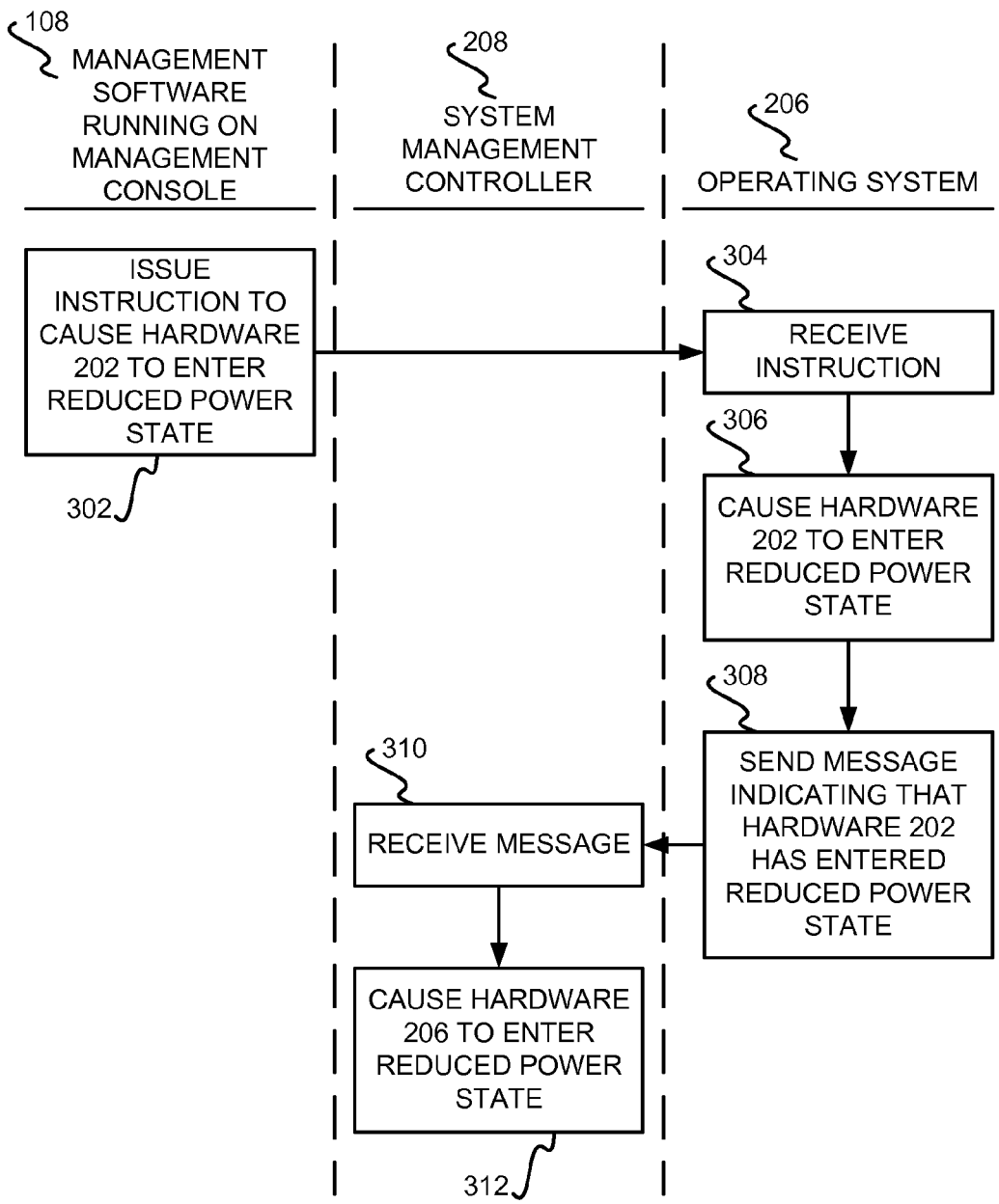
FIG. 3 is a flowchart of a method of use, according to an embodiment of the present invention.

FIG. 3 shows a method 300 that summarizes the operation of the system 102 of FIG. 2, according to an embodiment of the invention. FIG. 3 is divided into three columns, by dotted lines, which indicate which components perform the parts of the method 300. The parts of the method 300 in the left-hand column are performed by the management software 108 running on the management console 106. The parts of the method 300 in the center column are performed by the system management controller 208 of the computing system 102. The parts of the method 300 in the right-hand column are performed by the operating system 204 of the computing system 102.

An instruction is issued at the management software 108 running on the management console 106 to cause the hardware 202 of the computing system 102 to enter a reduced power state (302). The operating system 204 of the computing system 102 receives this instruction (304), either directly, or through the interface 210 as managed by the system management controller of the computing system 102. In response, the operating system 204 causes the hardware 202 to enter the reduced power state specified in the instruction (306).

The operating system 204 then sends a message to the system management controller 208 (308), which indicates that the operating system 204 has caused the hardware 202 to enter a reduced power state (308). The system management controller 208 receives this message (310). In response, the system management controller 208 causes the hardware 206 to also enter a corresponding reduced power state (312), as has been described above.

Figure 4:
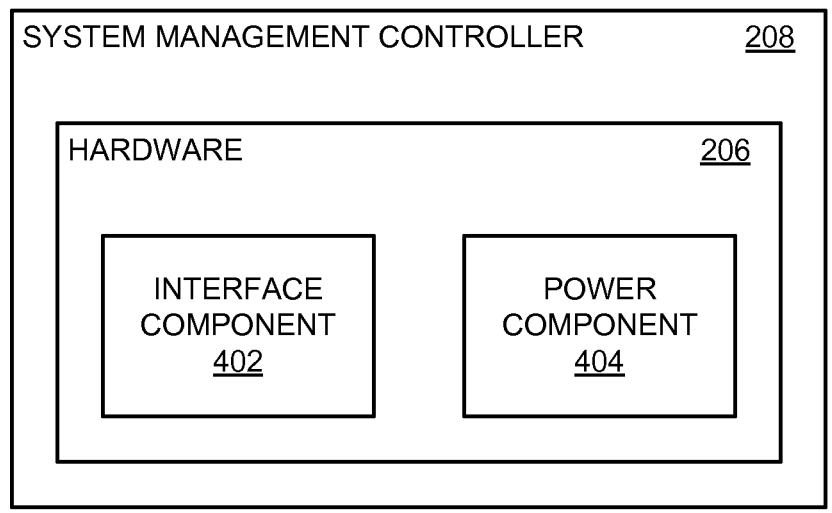
FIG. 4 is a rudimentary diagram of a system management controller, according to an embodiment of the invention.

In conclusion, FIG. 4 shows a rudimentary diagram of the system management controller 208, according to an embodiment of the invention. In the embodiment of FIG. 4, the system management controller 208 is considered to include the hardware 206 that implements the controller 208. The hardware 206 includes two hardware components 402 and 404, which may also be referred to as modules. The component 402 is an interface component, which manages the interface 210 that has been described.

The component 404 is a power component, which causes the hardware 206 to enter a reduced power state upon the hardware 202 entering a reduced power state, as has been described. As such, the component 404 may be that which receives the message from the operating system 204 indicating that the operating system 204 has caused the hardware 202 to enter a reduced power state. In one embodiment, the component 404 may be a computer-readable storage medium that has computer-readable code stored thereon for execution by the system management controller 208 to perform this functionality, which corresponds to parts 310 and 312 of the method 300.

It is finally noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A system comprising:
  an operating system;
  a first hardware to execute the operating system and that is under control of the operating system, the operating system to cause the first hardware to enter a first reduced power state to reduce power used by the first hardware;
  a second hardware different than the first hardware and that is not under control of the operating system, the first hardware to enter the first reduced power state independently of and separately from the second hardware entering a second reduced power state; and,
  a system management controller implemented by the second hardware, and that, in response to the operating system causing the first hardware to enter the first reduced power state, is to cause the second hardware to enter the second reduced power state corresponding to the first reduced power state to also reduce power used by the second hardware,
  wherein after the operating system causes the first hardware to enter the first reduced power state, the operating system is to send a message to the system management controller, the message to indicate that the operating system has caused the first hardware to enter the first reduced power system, the system management controller to cause the second hardware to enter the second reduced power state in response to receiving the message from the operating system.

2. The system of claim 1, wherein the system management controller is to manage an interface between the system, including the operating system and the first hardware under control of the operating system, and external management software separate from the system.

3. The system of claim 1, wherein the operating system is to receive an instruction from an external management software separate from the system, the instruction to specify that the operating system is to cause the first hardware to enter the first reduced power state, the operating system to cause the first hardware to enter the first reduced power state in response to receiving the instruction from the external management software.

4. The system of claim 3, wherein the operating system is to receive the instruction from the external management software in accordance with one of two different manners, a first manner being through an interface managed by the system management controller, and a second manner being directly, without passing through the system management controller.

5. The system of claim 1, wherein the second reduced power state is identical to the first reduced power state.

6. The system of claim 1, wherein the second reduced power state is similar but not identical to the first reduced power state.

7. The system of claim 1, wherein the first reduced power state is a more-power-conserving reduced power state than the second reduced power state.

8. The system of claim 1, wherein the system is a single, separate computing device.

9. The system of claim 1, wherein the system management controller is least one of an integrated management module and a baseboard management module.

10. A method comprising:
  causing, by an operating system, a first hardware under control of the operating system to enter a first reduced power state to reduce power used by the first hardware;
  after the first hardware enters the first reduced power state, and in response to the first hardware entering the first reduced power state, causing, by a system management controller, a second hardware to enter a second reduced power state corresponding to the first reduced power state to also reduce power used by the second hardware;
  receiving an instruction by the operating system from an external management software separate from the system, the instruction to specify that the operating system is to cause the first hardware to enter the first reduced power state,
  wherein the first hardware executes the operating system, and the second hardware is different than the first hardware and is not under control of the operating system,
  wherein the first hardware, the second hardware, the operating system, and the system management controller are part of a system,
  wherein the first hardware is caused by the operating system to enter the first reduced power state after the instruction has been received by the operating system from the external management software and in response to the instruction having been received by the operating system from the external management software.

11. The method of claim 10, wherein the system management controller is responsible for managing an interface between the system, including the operating system and the first hardware under control of the operating system, and external management software separate from the system.

12. The method of claim 10, further comprising:
  after causing the first hardware to enter the first reduced power state, sending a message by the operating system to the system management controller, the message to indicate that the operating system has caused the first hardware to enter the first reduced power system; and,
  after sending the message by the operating system, receiving the message by the system management controller,
  wherein the second hardware is caused by the system management controller to enter the second reduced power state after the message has been received by the system management controller and in response to the message having been received by the system management controller.

13. A system management controller for a system including the system management controller, an operating system, and a first hardware under control of the operating system, the system management controller comprising:
- a second hardware that is different than the first hardware and that is not under control of the operating system; and,
- a component of the second hardware to, in response to the operating system causing the first hardware to enter a first reduced power state to reduce power used by the first hardware, cause the second hardware to enter a second reduced power state corresponding to the first reduced power state to also reduce power used by the second hardware,
- wherein the first hardware is to enter the first reduced power state independently of and separately from the second hardware entering the second reduced power state,
- wherein the component is to receive a message from the operating system, the message to indicate that the operating system has caused the first hardware to enter the first reduced power system, the system management controller to cause the second hardware to enter the second reduced power state in response to receiving the message from the operating system.

14. The system management controller of claim 13, wherein the component is a first component, and the system management controller further comprises a second component responsible for managing an interface between the system, including the operating system and the first hardware under control of the operating system, and external management software separate from the system.

15. The system management controller of claim 13, wherein the first reduced power state is a more-power-conserving reduced power state than the second reduced power state.

16. A storage device having a program code stored thereon for execution by a system management controller of a system including the system management controller, an operating system, a first hardware under control of the operating system, and a second hardware of the system to implement the system management controller and not under control of the operating system,
- wherein the program code is to, in response to the operating system causing the first hardware to enter a first reduced power state to reduce power used by the first hardware, cause the second hardware to enter a second reduced power state corresponding to the first reduced power state to also reduce power used by the second hardware,
- wherein the first hardware is to enter the first reduced power state independently of and separately from the second hardware entering the second reduced power state,
- and wherein the program code is to receive a message from the operating system, the message to indicate that the operating system has caused the first hardware to enter the first reduced power system, the program code to cause the second hardware to enter the second reduced power state in response to receiving the message from the operating system.

* * * * *